(12) United States Patent
Bösterling et al.

(10) Patent No.: US 11,396,728 B2
(45) Date of Patent: Jul. 26, 2022

(54) SLEEPER FOR A TRACK SUPERSTRUCTURE

(71) Applicant: Vossloh Fastening Systems GmbH, Werdohl (DE)

(72) Inventors: Winfried Bösterling, Neuenrade (DE); Duo Liu, Dortmund (DE)

(73) Assignee: Vossloh Fastening Systems GmbH, Werdohl (DE)

( * ) Notice: Subject to any disclaimer, the term of this patent is extended or adjusted under 35 U.S.C. 154(b) by 284 days.

(21) Appl. No.: 16/605,952

(22) PCT Filed: Apr. 17, 2018

(86) PCT No.: PCT/EP2018/059794
§ 371 (c)(1),
(2) Date: Oct. 17, 2019

(87) PCT Pub. No.: WO2018/192930
PCT Pub. Date: Oct. 25, 2018

(65) Prior Publication Data
US 2021/0140120 A1    May 13, 2021

(30) Foreign Application Priority Data
Apr. 18, 2017  (DE) .................... 10 2017 108 224.7

(51) Int. Cl.
*E01B 3/32*  (2006.01)
*E01B 3/44*  (2006.01)
(Continued)

(52) U.S. Cl.
CPC ............... *E01B 3/44* (2013.01); *C04B 14/38* (2013.01); *C04B 16/04* (2013.01); *C04B 26/02* (2013.01);
(Continued)

(58) Field of Classification Search
CPC ..... E01B 3/32; E01B 3/34; E01B 3/38; E01B 3/36
See application file for complete search history.

(56) References Cited

U.S. PATENT DOCUMENTS 1,585,021 A * 5/1926 Dow ......................... E01B 3/32
238/30
4,090,665 A * 5/1978 Schlesener ................ E01B 3/32
238/349

(Continued)

FOREIGN PATENT DOCUMENTS

DE    19508108 A1 *  9/1996  ............... E01B 3/32
DE    19606469 A1    7/1998
(Continued)

OTHER PUBLICATIONS

Grundlagen et al., "Füllstoffe", Detlef Gysau, 2014, pp. 1-17, ISBN 978-3-86630-839-8, Vincentz Network (relevant for the reasons discussed in the specification).

(Continued)

*Primary Examiner* — Mark T Le
(74) *Attorney, Agent, or Firm* — The Webb Law Firm

(57) ABSTRACT

The invention relates to a sleeper for the track superstructure, which is manufactured in one piece from a plastic material, with the sleeper having an elongated base shape with two end sections, which are connected by a middle section of the sleeper and held at a distance and on their upper side in each case one contact surface is provided for in each case one rail to be supported on the respective end section with a reinforcement extending in the longitudinal direction of the sleeper being embedded into the middle section. In order to design such a plastic sleeper such that it has optimised strength and can be reliably manufactured even using cost-effective plastic/sand mixtures having a high proportion of sand, the invention proposes that the rein- (Continued)

forcement extends over the length of the middle section, that the reinforcement is in each case anchored in the respective end section in an edge region of the end sections assigned to the middle section and in that the reinforcement is wholly or partially arranged in the upper quarter of the height of the sleeper.

12 Claims, 5 Drawing Sheets

(51) Int. Cl.
*C04B 14/38* (2006.01)
*C04B 16/04* (2006.01)
*C04B 26/02* (2006.01)
*E01B 3/46* (2006.01)
*B29C 43/00* (2006.01)
*B29C 43/18* (2006.01)
*B29K 23/00* (2006.01)
*B29K 509/00* (2006.01)
*B29K 705/12* (2006.01)

(52) U.S. Cl.
CPC .............. *E01B 3/46* (2013.01); *B29C 43/003* (2013.01); *B29C 43/18* (2013.01); *B29C 2043/182* (2013.01); *B29K 2023/12* (2013.01); *B29K 2509/00* (2013.01); *B29K 2705/12* (2013.01)

(56) References Cited

U.S. PATENT DOCUMENTS

| | | | | |
|---|---|---|---|---|
| 5,055,350 A | * | 10/1991 | Neefe | ................... B29C 67/243 428/331 |
| 5,836,512 A | * | 11/1998 | Briggs | ...................... E01B 3/16 238/60 |
| 7,731,099 B2 | * | 6/2010 | Keightley | ................ E01B 3/46 238/29 |
| 8,366,015 B2 | | 2/2013 | Van Belkom | |
| 9,714,486 B2 | | 7/2017 | Van Belkom | |
| 10,774,477 B2 | | 9/2020 | Bosterling et al. | |

FOREIGN PATENT DOCUMENTS

| | | | | |
|---|---|---|---|---|
| DE | 102004033723 B4 | | 9/2009 | |
| DE | 202011050077 U1 | | 9/2011 | |
| EP | 1299321 B1 | | 2/2006 | |
| GB | 358085 A | * | 9/1931 | ............... E01B 3/32 |
| GB | 1580422 | | 12/1980 | |
| RU | 137296 U1 | * | 2/2014 | |
| SU | 1541330 A1 | * | 2/1990 | |
| WO | 2005100691 A1 | | 10/2005 | |
| WO | 2008048095 A1 | | 4/2008 | |
| WO | 2012059374 A1 | | 5/2012 | |
| WO | 2014104873 A1 | | 7/2014 | |
| WO | WO-2014104873 A1 | * | 7/2014 | ............... E01B 3/44 |
| WO | 2017182096 A1 | | 10/2017 | |

OTHER PUBLICATIONS

Mathur et al., "Testing and Evaluation of Plastics", 2003, ISBN 81-7764-436-x, Allied Publishers Pvt. Ltd.

* cited by examiner

SLEEPER FOR A TRACK SUPERSTRUCTURE

CROSS-REFERENCE TO RELATED APPLICATION

This application is the United States national phase of International Application No. PCT/EP2018/059794 filed Apr. 17, 2018, and claims priority to German Patent Application No. 10 2017 108 224.7 filed Apr. 18, 2017, the disclosures of which are hereby incorporated by reference in their entirety.

BACKGROUND OF THE INVENTION

Field of the Invention

The invention relates to a sleeper for track superstructure which is manufactured in one piece from a plastic material, with the sleeper having an elongated base shape with two end sections which are connected by a middle section of the sleeper and held at a distance and on its upper side in each case one contact surface is provided for in each case one rail to be supported on the respective end section.

Description of Related Art

In a track superstructure, the sleepers are usually supported on a ballast bed ("ballast bed superstructure") or on a fixed ground ("fixed track"), which is, for example, formed by concrete slabs or the like. Similarly, sleepers are used in the region of bridges as so-called "bridge beams".

The sleepers support the rails, which form the track, on which the respective rail vehicle travels, and hold the rails in their correct position. The fastening of the rails to the sleeper usually takes place by means of a rail fastening system which generally has a guide plate which guides the rail laterally.

During use, the sleepers are exposed to high loads. They not only have to absorb the weight of the rails and of the rail vehicle, but also high dynamic loads when a rail vehicle travels over them. At the same time, they have to tolerate rough and highly varying environmental conditions which are, for example, characterised by large temperature or moisture fluctuations. The natural radiation of sunlight, in particular its UV proportion, also afflicts the sleepers during practical use.

Conventional sleepers consist of wood, steel or concrete. Wooden sleepers are comparably expensive, but have a low weight which reflects positively in particular in bridge construction. Wooden sleepers are also suitable due to their low height for use in restricted space conditions and act elastically to a certain extent. This has the advantage that rail fastenings can be formed without significant effort which exhibit a certain resilience in the direction of gravity which is favourable for the life expectancy of the rail.

In contrast to the advantages of wooden sleepers, measures that are complex and to some extent questionable from an environmental point of view are required in order to protect wooden sleepers from rotting. Owing to the risk of rotting, wooden sleepers also have to be inspected and cared for in comparably short intervals. The dimensional stability of wooden sleepers has also proven inadequate for many applications.

Concrete sleepers are, in contrast, more wear resistant and can be manufactured more cost-effectively than wooden sleepers, even with higher manufacturing complexity. Their high rigidity contributes to the stability of the track and to the proper positioning of the rails of the track over a long service life. This makes concrete sleepers suitable in particular for the construction of routes which are travelled by trains at high speed.

In contrast to the advantages of concrete sleepers, they have a high weight and are not elastic. The lack of elasticity necessitates additional measures in order to achieve the resilience required in the respective rail fastening point. Concrete sleepers have also proven to be prone to quickly progressing ageing in extreme weather changes or under unfavourable environmental conditions, such as, for example, in the case of use in a saline environment.

As alternatives to conventional wooden or concrete sleepers, sleepers have been proposed which are manufactured from a plastic material. In order to give such a plastic sleeper the required strength, usually high-quality, often fibre-reinforced plastics are processed which are accordingly expensive.

In this case, it is known that the rigidity of plastic sleepers can be supported by a reinforcement, which is laid into the plastic and provides a decisive contribution to the load-bearing capacity of the sleeper owing to its shaping and material properties. To this end, the reinforcements are generally designed such that they absorb the majority of the forces occurring when the sleeper is travelled over by a rail vehicle. At the same time, by suitably designing the shape of the sleeper, its stiffness can be positively influenced. Examples of making it possible, through suitable arrangement of reinforcement elements, to also manufacture sleepers from comparably weak LDPE materials, are described in WO 2008/048095 A1. These known plastic sleepers usually have an elongated shape and are characterised in that in each case at least two, preferably four rod-like reinforcements made of steel are laid into the plastic. These steel reinforcement rods are in each case arranged in the regions adjoining the longitudinal edges of the sleeper and extend over the length of the sleeper. In this case, particular importance is placed on the reinforcement rods being located independently of one another in the plastic of the sleeper, i.e. not directly connected to one another. The reinforcement rods are consequently only fixed in position via the plastic of the sleeper. In this way, it should be possible to manufacture adequately rigid plastic sleepers even from an LDPE plastic, which per se has a strength which is only inadequate for these purposes. The stiffness of the plastic sleeper is also supported in that the end sections, on which, during use, the rails to be fastened are positioned and fastened, are connected to one another by means of a particularly shaped middle section of the sleepers. The middle section thus in each case has two web sections aligned parallel to one another in the longitudinal direction of the sleepers, which connect the end sections of the sleeper to one another and extend over the entire length of the sleepers. At the same time, the web sections are connected to one another by a cover section, which rests on them, or a base section, on which they are located. The respective cover or base section also extends over the entire length of the sleeper. The cross-section of the middle section of the sleepers is accordingly U or inversely U-shaped, with in each case one reinforcement rod being arranged in the free end regions of the webs and in the pendentive region between the respective cover or base section.

As alternatives to the expensive plastics, as are used in the case of the previously explained prior art, a plastic/sand mixture has been proposed in DE 20 2011 050 077 U1 for the manufacture of sleepers for the track superstructure. The sand and the polymers of the plastic should be combined with one another such that, on the one hand, adequate stiffness, on the other hand, an elasticity comparable with the behaviour of the wooden sleeper is achieved. The sleepers produced in this manner have a square shape without strengthening reinforcements, but can have on their underside spike-shaped projections in order to optimize their hold, for example, on a ballast bed.

A method that should allow the manufacture of such sleepers consisting of a sand/plastic mixture is described in EP 1 299 321 B1. However, practical tests have shown that, using the known approach, sleepers meeting the requirements set in practice cannot be produced on a large scale.

Against the background of the previously explained prior art, the object is to design a plastic sleeper manufactured from a plastic material such that they also have optimised strength and can be reliably manufactured even in the case of using cost-effective plastic/sand mixtures having a high proportion of sand.

SUMMARY OF THE INVENTION

A sleeper according to the invention for the track superstructure which is manufactured in one piece from a plastic material, accordingly has an elongated base shape with two end sections which are connected by a middle section of the sleeper and held at a distance and on its upper side in each case one contact surface is provided for in each case one rail to be supported on the respective end section, with a reinforcement extending in the longitudinal direction of the sleeper being embedded in the middle section.

In the case of a sleeper according to the invention, the reinforcement now extends over the length of the middle section and is anchored in the respective end section in an edge region of the end sections of the sleeper assigned to the middle section, with the reinforcement being wholly or partially arranged in the upper quarter of the height of the sleeper.

As in the case of the prior art explained at the outset, the durability and load-absorbing capacity is optimised even in the case of a sleeper according to the invention by a reinforcement extending in the longitudinal direction of the web being embedded into the plastic material of the middle section of the sleeper.

The reinforcement according to the invention improves, on the one hand, the load-bearing capacity of the middle section and counteracts its excessive bending, which could otherwise be caused by the weight of a rail vehicle, which travels over the rails supported by the sleeper during use.

On the other hand, the reinforcement is firmly anchored into the end sections and namely at a point, namely an edge region of the end sections assigned to the middle section of the sleeper, in which the end section in question meets the middle section. In this way, a permanently tear-free bond of the end sections to the middle section can easily be achieved even in the case of comparably brittle, but, owing to its cost benefits and other use properties, preferred plastic/sand mixtures of the previously explained type.

By the reinforcement extending in each case at least into the region of the end sections, on which the contact surface for the rail to be supported is formed, a bond of the end sections to the middle section of the sleeper can be manufactured which withstands even maximum loads of the sleeper. This applies in particular when the middle section is formed comparably filigree, in a web-like manner in the manner explained below. In particular since the reinforcement extends proceeding from the middle section over the region of the end sections supporting the contact surface and is thus shaped such that it, at least in sections, but optimally completely surrounds this region, the permanent secure cohesion between the middle section and end sections connected thereto can be ensured.

It is particularly surprising and significant in practice that positioning of the reinforcements exclusively in the upper quarter of the height of the sleeper has been found to be particularly favourable in regards to the bending behaviour and durability of the middle section. By positioning the reinforcement in close proximity to the free upper side of the middle section, the reinforcement can particularly effectively absorb the tensile forces, which bear on the middle section, when the end sections are loaded with the weight of a rail vehicle when it travels over the sleeper. This effect has an impact in particular when the middle section, as explained in detail below, is formed in a web-like manner according to an advantageous optimal configuration.

In addition to the reinforcement laid in the upper quarter of the height of the sleeper, a further reinforcement may be laid in the sleeper, if required. This can, for example, be located in the lower half or in the lower quarter of the height of the sleeper. The additional reinforcement can extend, viewed in the longitudinal direction of the sleeper, into the end sections over the reinforcement arranged in the upper quarter of the height of the sleeper. Thus, the reinforcement arranged in the upper quarter of the height of the sleeper can serve especially for the bonding of the middle section of the sleeper by it being anchored in the respective connection region between the middle section and the respective end section, whereas the lower reinforcement serves to optimise the carrying capacity of the end sections in the region on which the contact surface for the rail is formed. This has proven particularly favourable in the case of a web-shaped design of the middle section explained below.

The reinforcement arranged in the upper quarter of the height of the sleeper can also be formed in one piece such that it has one middle part assigned to the middle section of the sleeper, which extends in the upper quarter of the height of the sleeper, and two end parts, of which in each case one is connected to an end of the middle part of the reinforcement and which extend in each case proceeding from the assigned end of the middle part initially in the direction of the underside of the sleeper and then extend parallel to the underside of the sleeper and over the region of the end section on which the contact surface for the rail is formed.

The positioning of the reinforcement according to the invention and the fixed bond of the middle section to the end sections of the sleeper caused as a result have proven to be particularly advantageous when the middle section is formed by at least one web freely bridging the distance between the end sections, whose width measured in the width direction transverse to the longitudinal extension of the sleeper is smaller than the width of the end sections also measured in the width direction and the reinforcement is embedded in the web.

Using the reinforcement laid, according to the invention, in the middle section formed web-shaped in the case of this optimal configuration, it is therefore possible to also bond to the end sections, in a permanently secure and highly-loadable manner, the narrow, shaped middle section sitting, during use, only with a minimised surface on the respective ground.

The invention hereby proceeds from the surprising finding that by minimising the contact surface between the ground, on which the sleeper sits during use, and the middle section of the sleeper a notably improved bending behaviour is achieved when a rail vehicle travels over the rails supported on the sleeper. Thus, sleepers according to the invention, in spite of their volume and weight-minimised design, exhibit, in practical use, an inclination and track change behaviour which safely meets the requirements set in practice.

The width of the optionally web-shaped middle section is essentially smaller than its length and also smaller than its height such that it connects the end sections together in the manner of a beam located upright on its narrow longitudinal side. A beam web aligned in such a manner has a maximum stiffness compared to a load acting in the direction of gravity and therefore counters an excessive bending with maximum resistance in spite of its comparably filigree shape.

At the same time, it has been proven surprisingly advantageous in regards to the load-bearing capacity of a sleeper according to the invention for the contact surface, with which the sleeper sits on the ground during use, to be minimised by the optionally web-shaped formation of the middle section. This is proven in particular favourable when a sleeper according to the invention is supported during use on a ballast bed. Through the minimised contact surface, the sleeper can, when the rails supported by it are travelled on by a rail vehicle, sink deeper into the ground as a result of the weight bearing on it than in the case of sleepers with contact surfaces which extend fully over the maximum width and length of the space taken up by the respective sleeper. In the case of a sleeper designed according to the invention, the ground diverts the forces introduced in a concentrated manner via the web and acting in the direction of gravity, thus only reduced counterforces oppose the web such that local loading peaks are avoided in the optionally web-shaped middle section of the sleeper and therefore a reliably high bending and an unfavourable change of the sleeper geometry caused by warping are avoided in the support of the sleeper. As a result, through the particular design of the invention, it means that the sleeper according to the invention ensures, in spite of its filigree design, maximum directional stability of the rails installed thereon.

This bending stiffness of the optionally at least one web provided as a middle section of the sleeper can also be optimised in that the height of the web is varied over the distance between the end sections of the sleeper. Thus, it may, for example, be expedient for the web to be formed in the manner of a vaulted arch or its height to be able to rise in relation to the plane, in which the end sections sit in the installed position with their underside, proceeding from an end section continuously to, for example, the centre in relation to the length, in order for it to be again continuously smaller up to the other end section. The vertical profile therefore follows the load distribution, to which the optionally web-shaped middle section is exposed in practice, when a rail vehicle travels the rails supported on the sleeper.

In regards to the installation and manufacture of a sleeper according to the invention, it has been proven advantageous for the sleeper to be shaped mirror-symmetrically at least in relation to its longitudinal axis. A particularly expedient configuration of the sleeper in regards to simple and error-free installation emerges when the sleeper is formed symmetrically also in relation to its width axis aligned transverse to the longitudinal axis and parallel to the underside of the sleeper and running through its centre. Through such a symmetrical configuration, mistakes in the alignment of the sleeper can be avoided since, owing to the symmetrical shaping, a determined assignment of the sides or sections of the sleeper to a determined position does not have to be observed.

In the case of a particularly practical configuration of the invention, the middle section optionally comprises two webs arranged spaced in the width direction. This configuration ensures optimised use properties with simultaneously maximised durability of the sleeper. Thus, the two webs allow a further reduction of their dimensions with simultaneously continually minimised contact surface between the ground and the sleeper. It has proven particularly advantageous here for the webs in the middle region of the sleeper to delimit between them a clearance open towards the ground. Material of the ground can penetrate into this clearance such that intensive grouting with the ground can be achieved. This applies in particular when a sleeper according to the invention designed in such a manner is used to support a track on a ballast bed. The ballast penetrates into the opening regions surrounding the webs and causes effective securing of the sleeper against transverse displacements as a result of transverse forces which occur when a rail vehicle travels over the rails supported by the sleeper or as a result of the changes in length which result in the case of rails in particular in the case of extreme changes in surrounding temperatures.

In the event that at least two webs designed according to the optional proportions of the invention are provided in the middle section of the sleeper, a reinforcement arranged according to proportions of the invention and anchored with the end sections is optimally located in each of the webs of the middle section in order to ensure a permanently secure bond of each web to the respective end section and a similarly optimised stiffening of all webs. The symmetry of the shaping of a sleeper according to the invention has proven particularly expedient in this context if the webs are not linearly stretched, but rather have a profile that is angular, curved or otherwise adapted to the respective loads, functions or local particularities.

Like the symmetrical formation of the sleeper, it contributes to the simple, error-free installation if in the case of two optionally provided webs in the middle section of the sleeper these webs are shaped identically. Errors in the case of the proper alignment of the sleeper during installation and uneven loads in practical use can thus be safely prevented.

It may also contribute to optimised bending behaviour under the loads occurring in practice and to the desired penetration of material of the ground into the clearance, which is surrounded by the webs and open at the bottom, for the webs in each case to have a section running outwards proceeding from the first end section in the width direction and a second section which is connected to the end of the outwards running section of the respective web facing away from the first end section and runs back to the second section. In the case of webs aligned in this manner, the clearance surrounded by the webs in the region of the centre of the sleepers has a maximum width such that a maximum fillable volume is available there.

The method described in the international patent application PCT/EP2016/059064 and the material also presented in this international patent application is particularly well suited for the manufacture of sleepers designed according to the invention. The content of the PCT/EP2016/059064 is hereby incorporated by reference into the text of the present application. The method described in PCT/EP2016/059064 for manufacturing a sleeper for use in the track superstructure comprises at least the following work steps:

a) providing a mixture which consists 10 to 60 mass % of a granulate of a plastic deformable by heat application and as the remainder of a sand with a bulk density of 1.4 to 2.0 $g/cm^3$;

b) heating the mixture to a temperature of 150-200° C.;

c) filling the mixture into a press mould representing the sleeper;
d) compressing the mixture in the mould at a press force measured in the mixture of 1 to 5 MPa for a press duration of up to 60 min;
e) demoulding the sleeper from the mould.

In the completely hardened state, plastic/sand mixtures mixed and processed in this manner are comparably brittle. Through the manner of processing and mixing of sand and plastic described in PCT/EP2016/059064 and the design according to the invention, it is still possible to provide a sleeper which is not only cost-effective to manufacture, but has optimised damping behaviour in addition to high rigidity and durability.

A sleeper according to the invention in this case preferably consists of a plastic/sand mixture, whose plastic content is 10 to 60 mass % and whose remainder consists of sand with an average grain diameter of 0.1 to 0.5 mm, with the bulk density of the sand advantageously being 1.4 to 2.0 g/cm$^3$. Plastic contents of 20 to 40 mass % have proven to be particularly advantageous here. As plastic, all plastics can essentially be used for the manufacture, according to the invention, of a sleeper which can be mixed with a sand obtained in accordance with the specifications according to the invention and can be compressed under heat and pressure application such that an adequate bond results between the plastic and the grains of the sand embedded therein. In particular, the plastics usually designated as thermoplastic are suitable to this end.

Plastic granulates are particularly suitable here which consist of a polypropylene granulate (PP granulate) or a polyethylene granulate (PE granulate), with PP granulate having been found to be particularly expedient. A granulate consisting of a high-density polyethylene (HDPE granulate) may also be suitable for the invention when particular requirements emerge for the plastic material.

The plastic granulate provided for the manufacture of a sleeper according to the invention can consist unmixed from a single plastic granulate type or be used as a mixture of different plastic granulate types.

In the case where a plastic granulate mixture is supposed to be used, it has been proven favourable for the plastic granulate to consist 40 to 60 mass % of PP granulate and as the remainder of PE or HDPE granulate.

It has similarly been proven favourable in regards to good mould filling when compressing the sand/plastic mixture filled into the shaping mould according to the invention for the melt flow MFI/230/2,16 (see also: A. B. Mathur, I. S. Bhardway, "Testing and Evaluation of Plastics", Allied Publishers PVT. Limited, 2003, ISBN 81-7764-436-X) determined according to DIN EN ISO 1133 in the case of a test temperature of 230° C. and a load mass of 2.16 kg of the plastic or plastics, of which the plastic granulate consists, to be in each case greater than 20.

Good mixing of the plastic material with the sand of the sand/plastic mixture processed according to the invention can be ensured by the grain size of the granulate being adapted to the grain size of the sand.

The sand of the plastic/sand mixture mixed with the plastic granulate, of which the sleeper according to the invention preferably consists, has a bulk density of 1.4 to 2.0 g/cm$^3$, with sands with a bulk density of at least 1.6 g/cm$^3$ having been found to be particularly favourable. In the case of sands with a bulk density selected within the specifications according to the invention, good mixing is ensured with the plastic granulate and accordingly good bonding of the sand grains to the plastic matrix surrounding them in the finished sleeper, which is formed from the plastic granulate grains melted and compressed in the course of the heating and pressing process. Bulk densities of up to 1.9 g/cm$^3$, in particular at least 1.7 g/cm$^3$ have been proven to be particularly favourable.

Practical tests have shown that sand, which consists of grains with an average grain diameter of 0.1 to 0.5 mm, is particularly well suited for the purposes according to the invention. In the case of such a grain size, a particularly good embedding of the sand grains into the plastic matrix of the finished manufactured sleeper results. Not only is the stability of the sleeper hereby optimised, but its damping behaviour and its elasticity is also optimally set for use as a sleeper in a track for rail vehicles.

All sands are considered as sand for the purposes according to the invention, whose bulk density corresponds to the specifications according to the invention as a minimum requirement.

Practical tests have shown that no particular requirements are set for the types of sand provided in the material of a sleeper according to the invention. Broken sands have been proven to be advantageous, but not absolutely necessary. In this case, it generally concerns artificially produced sands, as result, for example, with the recycling of products manufactured on a sand basis, such as sleepers according to the invention. Broken sands are characterised in that their grains have sharp-edged projections on their circumference via which they are hooked with the grains adjoining them and thus contribute to a particular high strength and breakthrough safety of the sleeper produced according to the invention.

The hardness of the grains of the sand used according to the invention advantageously has a hardness of 5 to 8 determined according to Mohs (see, for example, Detlef Gysau, "Füllstoffe", 3rd Edition, Hannover: Vincentz network, 2014, ISBN: 9783866308398), with sands with grains, which have a hardness of at least 6, in particular at least 7 determined according to Mohs, having been proven to be particularly suitable.

Sleepers produced according to the invention have a high safety against breakthrough.

Tests carried out according to DIN EN 13146-10 have resulted in pull-out resistances that are often high for the sleepers manufactured according to the invention and meet the strictest requirements such that the requirements set in practice in this respect are always reliably met.

In regards to the permanently secure bonding of the middle section of the sleeper to the end sections, it has been found to be particularly favourable for the reinforcement to be shaped in the manner of a continuous loop with two longitudinal sections and two narrow sections of which in each case one extends between the ends of the longitudinal sections assigned to one another and is anchored in one of the edge regions of the end sections.

In particular when the middle section of the sleeper is formed by two webs, which connect the end sections to one another, it has been found to be particularly advantageous in regards to avoiding tears in the region of the transition of the webs to the end sections and optimised stiffening of the webs for one of the longitudinal sections to be embedded in one web, the other longitudinal section in the other web of the middle section and the two narrow sections of the loop-shaped reinforcement in each case in the assigned edge region of the end sections.

A reinforcement formed as a self-contained loop can therefore be positioned not only during manufacture particularly easily in the sleeper, but rather also allows a particularly easy and also effective bonding of the end sections to the webs.

However, it is alternatively also of course possible to embed reinforcements elongated in the manner of a rod into the webs and to form at the ends of such reinforcement rods suitable forming elements, such as hooks, disc offset or the like, by way of which a positive-locking bond acting in the longitudinal direction of the reinforcement rods is ensured between the reinforcements and the plastic material of the end sections and therefore a blockade of the rod-shaped reinforcements against displacement in their longitudinal direction. The bond to the surrounding material of the sleeper can also be improved by profiling the reinforcement rods.

The reinforcement provided according to the invention can consist of a solid material, such as, for example, of a metal material shaped into a rod, a strip or the like, in particular a steel material. The reinforcement can in this case obtain in the course of its manufacture directly the respective shaping, in particular its closed loop shape, or be shaped, in particular bent from a pre-fabricated semi-finished product such as a rod or strip material.

Alternatively to or in combination with a solid embodiment, the reinforcement provided according to the invention can also be formed as a bundle or strand of a plurality of individual fibres. As reinforcement, solid rods, which consist, for example, of steel or another suitable metal material, are therefore, for example, equally considered as fibre strands or bundles, which consist of sufficiently solid fibres, and these fibres, for example, can be steel fibres, high-performance fibres, such as glass fibres or aramid fibres or other technical textile fabrics with sufficient strength. The reinforcement of the rails on a sleeper according to the invention can be simplified in that parts of the rail fastening system provided in each case for the fastening are integrated into the sleeper. To this end, for example, in the region of the contact surfaces, provided on the end sections, made of the plastic material of the sleeper, forming elements can be formed such as projections, protrusions, slide surfaces, recesses, depressions and the like, to laterally guide or support the rails to be fastened on the respective end section or to guide, fasten or support one or a plurality of structural elements of a rail fastening system provided to fasten the rail. The forming elements provided to guide the rail can, for example, be lateral delimitations which delimit the contact surface provided on the respective end section and to laterally guide and support the rail foot after placing the rail on the contact surface. These lateral delimitations act in the manner of a conventional guide plate and divert the transverse forces occurring during use into the sleeper. In order to enable simple adjustment of the seat of the rail on the respective contact surface to the prescribed track width, bar-like track clips known per se can be arranged between the lateral delimitations and the rail foot. A thread, a dowel or another counter bearing for a tension element, such as a sleeper screw or a sleeper screw bolt can also be formed in or on the end sections in each case. Such a tension element is usually required in order to tension a spring element on the sleeper, which exerts on the rail foot the spring elastic hold-down force required to be held down on the sleeper in the finished installed rail. The forming elements in question provided to guide or install the components of the respective rail fastening system can be formed without problems such that the components of the rail fastening system can already be pre-installed remote from the place of installation of the sleeper, for example, in the sleeper factory such that only a few installation activities, which are to be carried out automatically as far as possible, are required at the place of installation.

In order to improve the durability even in unfavourable weather conditions, such as, for example, in regions with significant dust development or significant occurrence of sand, it may also be expedient for a support plate to be embedded into the plastic material of the sleeper in the region of the contact surfaces provided on the end sections, which consists, for example, of a higher-strength or particularly wear-resistant material, such as, for example, a suitable steel material, a suitable cast iron material or a high-strength and highly-resistant plastic via which, during use, the rail supported on the respective end section of the sleeper is supported extensively on the end section in question. The support plate can be formed such that it allows the use of fastening systems proven in practice which are based on such a plate. This has in particular proven to be suitable when a sleeper according to the invention is supposed to replace a sleeper worn from practical use, but parts of the already present fastening system or the machines present for installing this system are supposed to continue to be used. A sleeper according to the invention can be adjusted without problems to such specifications via a support plate integrated therein.

A further configuration of the invention significant for practical use is characterised in that at least one forming element is formed on the underside of a sleeper according to the invention which cooperates in a positive-locking manner with a forming element present on the ground in the case of a sleeper placed on the ground. This forming element provided on the underside of the sleeper is a projection or a recess which cooperate with corresponding recesses or projections present on the ground. For example, the forming elements provided on the underside can be formed such that individual ballast stones cooperate with them in a positive-locking manner by engaging into a recess provided as a forming element or by a projection provided on the underside of the sleeper protruding into a corresponding hollow, a clearance and the like in the ballast bed. The sleeper can therefore also be secured against displacement in its longitudinal direction, i.e. transverse to the rails supported on it, by the forming elements provided in this manner.

The forming elements provided on the underside of a sleeper according to the invention can also contribute to the space-saving secure transport and to the similarly space-saving secure stocking of sleepers according to the invention. The forming elements in question can thus in particular be adjusted such that in the case where a sleeper according to the invention is stacked on another, they ensure by positive-locking that the sleepers sitting on one another in the stack can only be separated from one another by lifting counter to the direction of gravity. In this case, recesses can, for example, be provided on the underside of the sleepers, into which components of a rail fastening system pre-installed in each case under the sleeper in question can freely protrude. A contact between the pre-installed components of one sleeper and the other sleeper placed on this sleeper can be safely avoided.

The possibility of a secure stack formation can also be supported by at least optionally one first alignment aid being formed on its upper side, to which a second alignment aid is assigned on the underside of the sleeper and in that the alignment aids of the sleeper are arranged such that in the case where a sleeper provided with alignment aids in the same manner at least on its underside is placed on the sleeper to form a sleeper stack, the alignment aid provided on the upper side of one sleeper cooperates with the second alignment aid present on the underside of the other sleeper placed on this sleeper and thus fixes the sleepers against one another in a plane aligned parallel to the underside of the sleepers.

BRIEF DESCRIPTION OF THE DRAWINGS

The invention will be explained in more detail below based on a drawing showing exemplary embodiments. Whose figures in each case schematically show.

DESCRIPTION OF THE INVENTION

The sleepers 1; 101 shown in the figures for the track superstructure in each case have one elongated base form with a length L measured transverse to the longitudinal extension LR of the rails S1, S2 installed on the sleepers 1; 101 which is essentially greater than their width B measured in the width direction BR transverse to the length L and the height H measured perpendicular thereto.

The sleepers 1; 101 in each case comprise two end sections 2, 3; 102, 103 and a middle section 4; 104 arranged between the end sections 2, 3; 102, 103.

Figure 3:
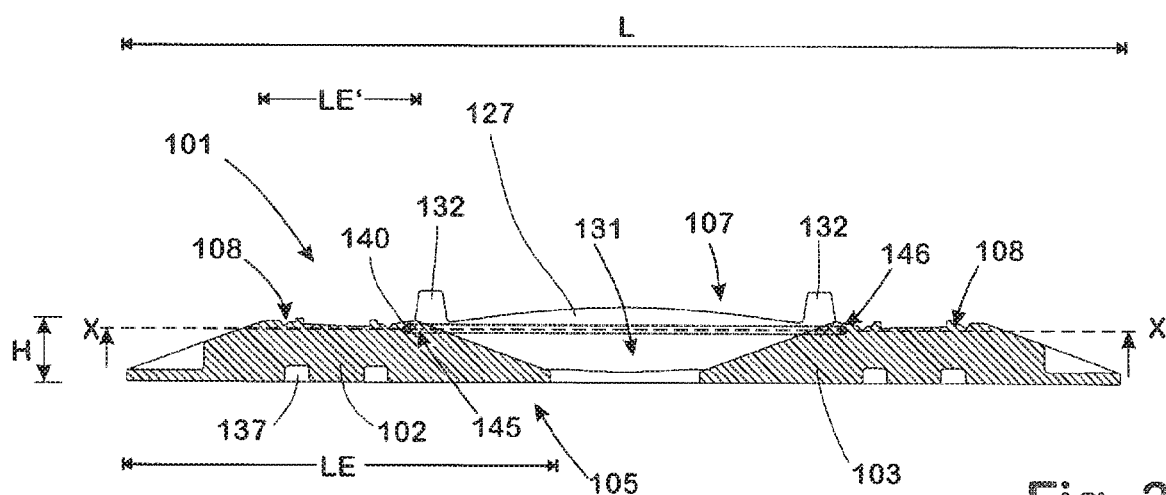
FIG. 3 the sleeper according to FIG. 2 in a longitudinal section.
Figure 4:
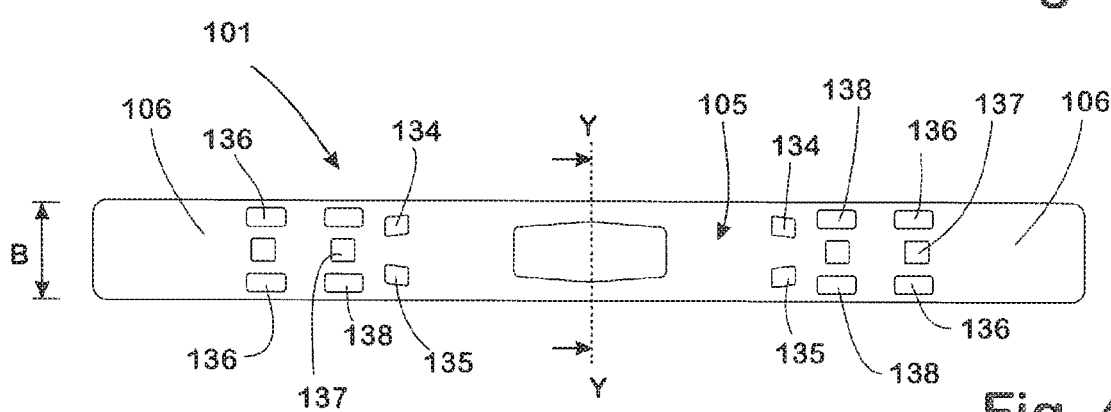
FIG. 4 the sleeper according to FIG. 2 in a view from below.
Figure 5:
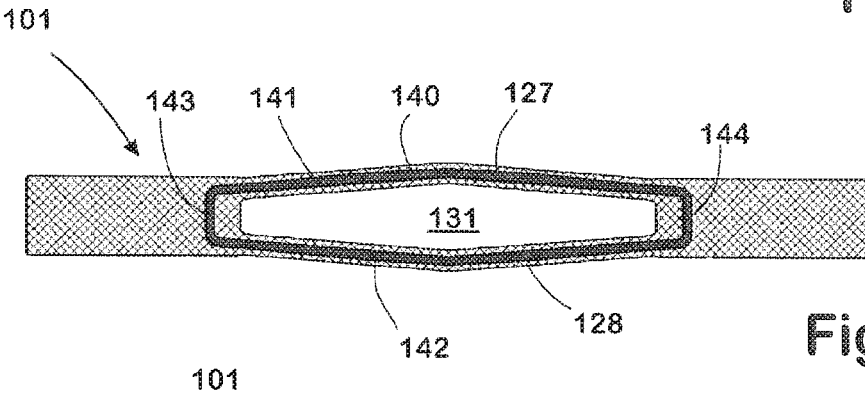
FIG. 5 the sleeper according to FIG. 2 in a section along the cut line X-X marked in FIG. 3.
Figure 6:
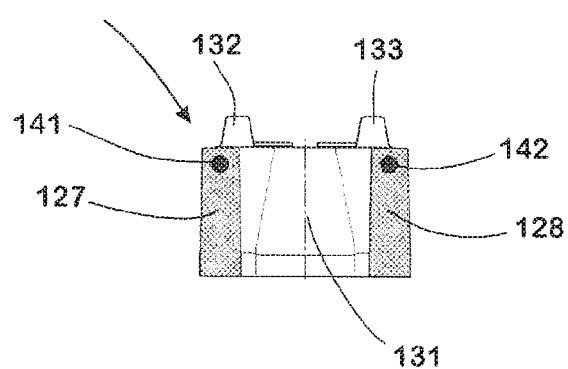
FIG. 6 the sleeper according to FIG. 2 in a section along the cut line Y-Y marked in FIG. 4.

The end sections 2, 3; 102, 103 have, viewed in the longitudinal section (FIG. 3), in each case a trapezoidal cross-sectional shape, in the case of which the length LE of the flat and rectangular base surface 6; 106 assigned to the underside 5; 105 of the sleeper 1; 101 is greater than the length LE' of the cover surface 108 of the end sections 2, 3; 102, 103 assigned to the upper side 7; 107 of the sleeper 1; 101. The narrow sides 9, 10; 109, 110 of the end sections 2, 3; 102, 103 rise accordingly proceeding from the narrow sides of the base surface 6; 106 in the direction of the cover surface 108 of the sleepers 1; 101 and form an acute angle with the base surface 6; 106.

The longitudinal outer sides 9a, 10a; 109a, 110a of the end sections 2, 3; 102, 103 are also aligned obliquely proceeding from the base surface 6; 106 of the end sections 2, 3; 102, 103 in the direction of the cover surface 108, but less strongly inclined than the narrow sides 9, 10; 109, 110. The width BE' of the cover surface 8, 108 of the end sections 2, 3; 102, 103 rectangular in their base form is therefore also shorter than the width of the base surface 6; 106 corresponding to the width B of the sleeper 1; 101.

In each case, a recess 11; 111 is formed into the outerlying narrow side 9; 109 of the end sections 2, 3; 102, 103 facing away from the middle section 4; 104. On the one hand, weight is saved by the material lacking in the region of these recesses 11; 111. On the other hand, ballast stones penetrate into the recess 11; 111 in the case of an installation of the sleeper 1; 101 on a conventionally formed ballast bed not shown here for the sake of clarity, whereby the grouting of the sleeper 1; 101 with the ballast bed is improved and counteracts displacement of the sleeper 1; 101 transverse to the longitudinal direction LR of the rails S1, S2.

A flat contact surface 112 extending over the width B of the sleeper 1; 101 is in each case formed into the cover surface 108 of the end sections 2; 3; 102; 103 of the sleeper 1; 101 on which the foot F1, F2 of the respective rail S1, S2 stands during use. Optionally, a plate element or a plurality of plate elements, which are not visible here, can be arranged between the foot F1, F2 and the contact surface 112. The plate elements can, for example, consist of an elastic material or a solid material in order to give the support of the rail S1, S2 a certain resilience in the direction of gravity when using an elastic material or to evenly distribute forces bearing on the contact surface when using a solid material. Of course, elastic and solid plates can be used in combination in order to achieve the property or functional combination desired in each case.

In addition, further forming elements are formed on or into the cover surface 108 which serve to guide the respective rail S1, S2 or to mount components provided for their fastening on the sleeper 1; 101.

The contact surface 112 is thus delimited on its edges extending over the width B by ribs 13, 14; 113, 114. The ribs 13, 14; 113, 114 serve to laterally guide the rail foot F1, F2 of the respective rail S1, S2.

The ribs 13, 14; 113, 114 are divided centrally by in each case a cylindrical indentation 115, 116 introduced, for example, in the form of a borehole. In each case one sleeper screw 17, 18 is screwed into the indentation 115, 116 with its thread shaft when fastening the rail S1, S2. The thread provided on the thread shaft of the sleeper screw 17, 18 can be formed such that it is cut into the material surrounding the indentation 115, 116 when screwing.

Figure 1:
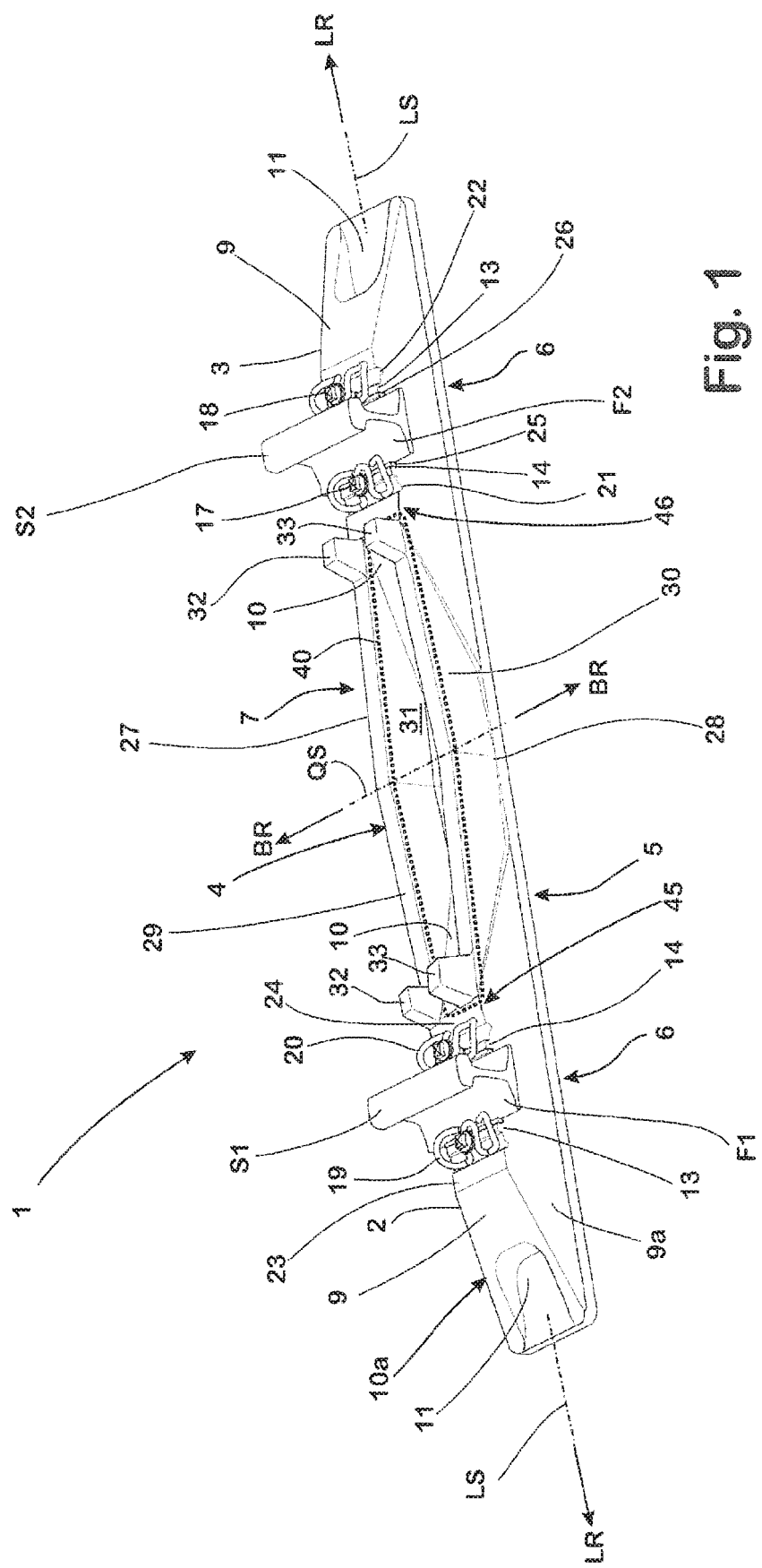
FIG. 1 a first sleeper in a perspective view from above.
Figure 2:
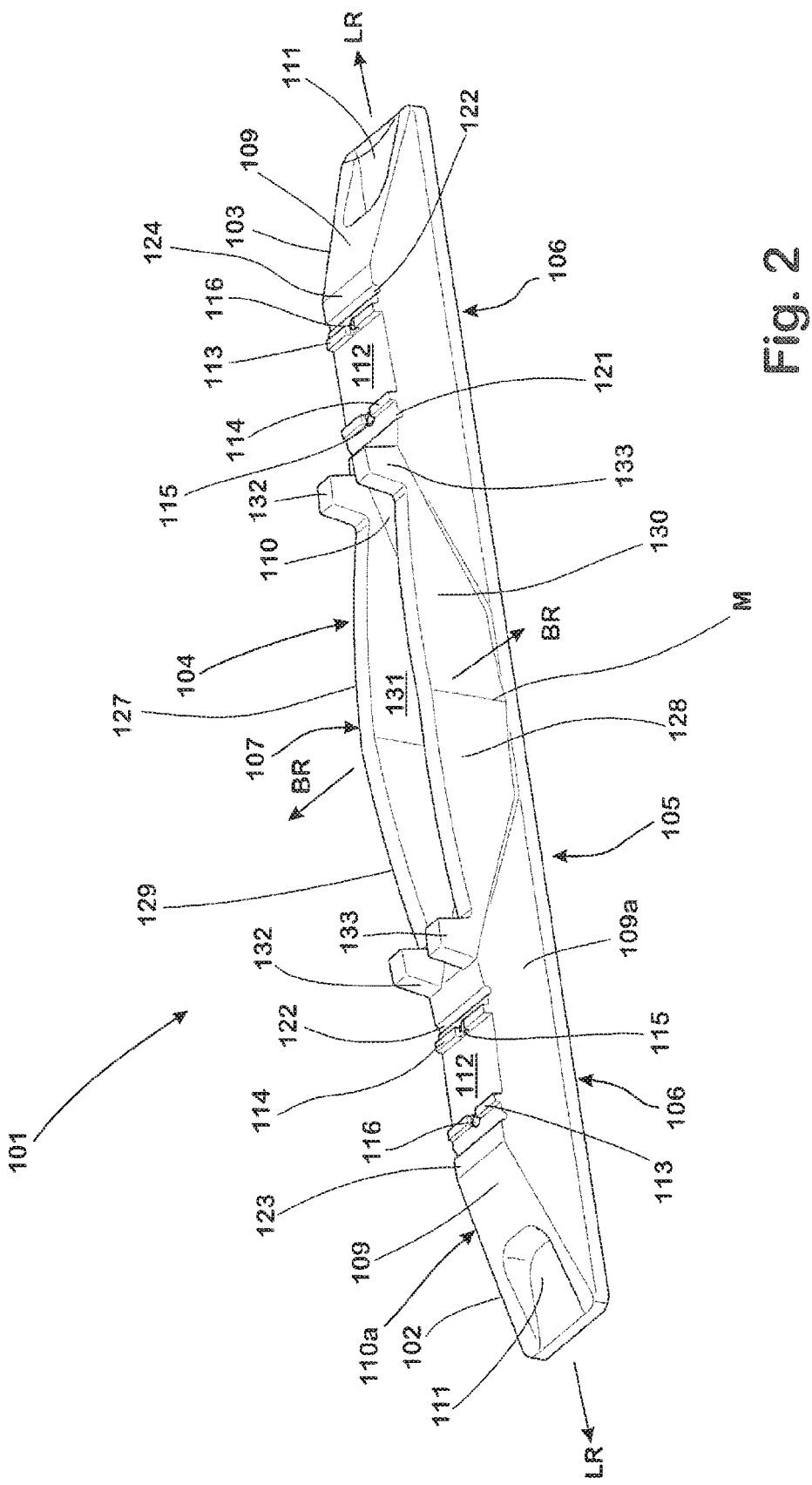
FIG. 2 a second sleeper in a perspective view from above.

The sleeper screws 17, 18 serve to tighten in each case a conventionally formed, W-shaped tensioning clamp 19, 20 which exerts an elastic hold-down force on the rail foot F1, F2 with the free ends of its holding arms in the case of the finished installed rails S1, S2. To this end, the sleeper screws 17, 18 are guided with their thread shaft through the middle loop of the respective tensioning clamp 19, 20 such that their screw head presses the middle loop in the direction of the cover surface 6, 106 of the respective end section 2, 3; 102, 103. The torsion sections of the tensioning clamps 19, 20 in each case arranged between the holding arms and the middle loop sit in each case in a channel 21, 22; 121, 122 formed into the cover surface 106 as a further forming element which runs on the side of the ribs 13, 14; 113, 114 facing away from the contact surface 112 parallel thereto and also extends over the width B of the sleeper 1; 101. In addition, in each case one surface 23, 24; 123, 124 obliquely declining in the direction of the respective channel 21, 22; 121, 122 is provided on the side of the channels 21, 22; 121, 122 facing away from the ribs 13, 14; 113, 114. The tensioning clamps 19, 20 sit on this surface with their torsion sections when they are located in a pre-installation position offset towards the finished installation position in the longitudinal direction LR of the sleeper 1; 101 in which the end sections of the holding arms of the tensioning clamps 19, 20 are located outside of the contact surfaces 112 such that the respective rail S1, S2 can be placed with its rail foot F1, F2 unhindered on the contact surface 112. The tensioning clamps 19, 20 are then displaced in the direction of the respective rail S1, S2 until the holding arms bear on the rail foot F1, F2 and the torsion sections of the tensioning clamps 19, 20 sit in the assigned channel 21, 22; 121, 122. The finished installation position is shown in FIG. 1 for the tensioning clamps 19, whereas the tensioning clamps 20 are in each case located in the pre-installation position.

Examples of the tensioning clamps 19, 20 and their function are known in large numbers from practice and are, for example, described in DE 10 2004 033 723 B4 or WO 2012/059374 A1 and the further publications mentioned in these two patent publications.

The exact setting of the position of the rail S1, S2 on the contact surface 112 of the end sections 2, 3; 102, 103 assigned to it in each case can be set by interchangeable strip-like track clips 25, 26 which are arranged in each case between the ribs 13, 14; 113, 114 and the lateral edge of the foot F1, F2 of the respective rail S1, S2. The thickness of the interchangeable track clips 25, 26 is in this case selected according to the clear width of the gap possibly resulting between the respective ribs 13, 14; 113, 114 and the edge of the rail foot F1, F2 in the case of the rail S1, S2 located in the target position such that the respective track clip 25, 26 sits free of play between the rail foot F1, F2 and the rib 13, 14; 113, 114 assigned in each case.

The middle section 4, 104 of the sleepers 1; 101 connecting the end sections 2, 3; 102, 103 and held at a distance is formed by two webs 27, 28; 127, 128. The webs 27, 28; 127, 128 are shaped mirror-symmetrically in relation to the longitudinal axis LS and in relation to the transverse axis QS of the sleepers 1; 101. They in each case have a first web section 29, 129. The web section 29; 129 of the web 27; 127 is in this case connected with its one end to one end section 2; 102 such that it is connected to the end section 2; 102 in the corner region of the cover surface 108 assigned to one longitudinal outer side 9a; 109a of this end section 2; 102 and to the middle section 4; 104. Similarly, the web section 29; 129 of the other web 28; 128 is connected with its one end to one end section 2; 102 such that it is connected to the end section 2; 102 in the corner region of the cover surface 108 assigned to one longitudinal outer side 10a; 110a of this end section 2; 102 and the middle section 4; 104. The webs 27, 28; 127, 128 then run proceeding from the end section 2; 102 directed slightly outwards to the centre M of the length L of the sleeper 1; 101. The oblique alignment of the web sections 29; 129 is in this case dimensioned such that the distance of the longitudinal outer sides of the web sections 29; 129 of the webs 27, 28; 127, 128 corresponds at their end assigned to the centre M with the width B of the sleeper 1; 101. In each case, a second web section 30; 130 of the webs 27, 28; 127, 128 is connected to the end of the web sections 29; 129 assigned to the centre M. This second web section 30; 130 runs in each case slightly obliquely aligned in the direction of the second end section 3; 103 and is connected with its end assigned to this end section 3; 103 in the same manner as the respectively first web section 29; 129 of the webs 27, 28; 127, 128 to the first end section 2; 102.

The webs 27, 28; 127, 128 in this way define between them a chamber 31; 131 extending proceeding from the end sections 2, 3; 102, 103 in the direction of the centre M which is open towards the underside 5; 105 and towards the upper side of the sleeper 1; 101. In this way, for example, in the case where the sleeper 1; 101 is placed on a ballast bed, ballast stones can penetrate into the chamber 31; 131 and in this way can improve the grouting of the sleeper 1; 101 with the ground. Similarly, in this case since the chamber 31; 131 is open towards the underside 5; 105 of the sleeper 1; 101, the contact surface between the ballast bed and the sleeper 1; 101 is minimised such that, under the load of a rail vehicle, the sleeper, in particular in the region of its middle section 4; 104, can sink deeper into the ballast bed than in the case of a sleeper with a completely closed underside.

The bending stiffness of the webs 27, 28; 127, 128 is also improved as a result of their height increasing in each case proceeding from its ends assigned to the end sections 2, 3; 102, 103 continuously to the centre M. The webs 27, 28; 127, 128 thus have in the region of their upper side, an arc-shaped course which follows the tension course occurring in the webs 27, 28; 127, 128 in the case of loading due to the weight of a rail vehicle.

Figure 9:
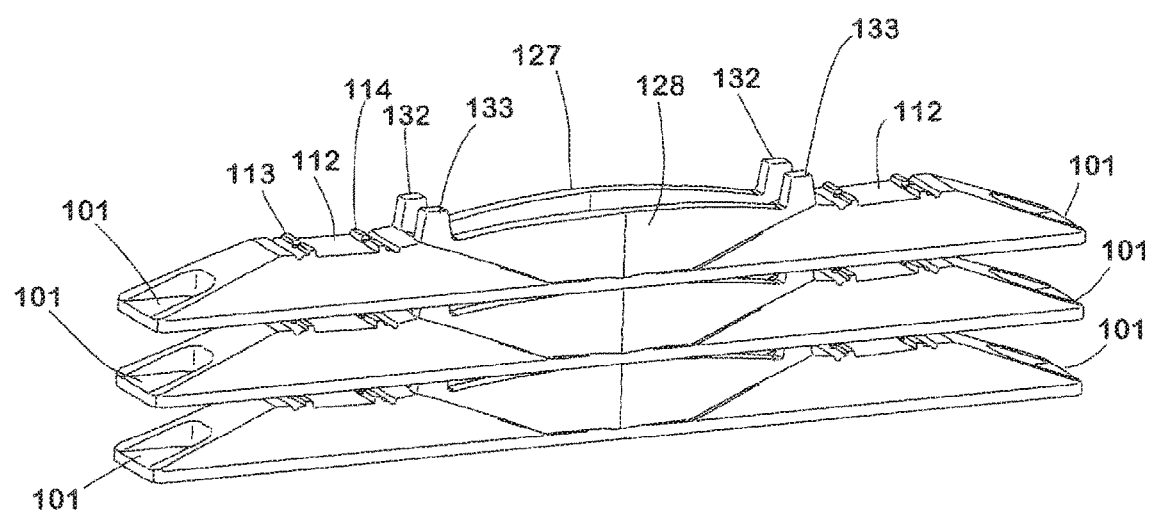
FIG. 9 a stack of sleepers in a perspective view from above.

In the case of the sleeper 101, in each case one alignment aid 132, 133 shaped in the manner of a bulge protruding upwards is formed on the end regions of the webs 127, 128 adjoining the end sections 102, 103. In each case, a second alignment aid 134, 135 in the form of an indentation formed into the underside 105 is assigned to these alignment aids 132, 133 on the underside 105 of the sleeper 101, the shape of said indentation being adapted to the shape of the first alignment aids 132, 133 such that in the case of two sleepers 101 stacked on one another the first alignment aid 132, 133, present on the upper side 107, of the sleeper 101, arranged at the very bottom in each case, engages in a positive-locking manner into the second alignment aid 134, 135 which is formed into the underside 105 of the second sleeper 101 sitting on it. In this way, the similar sleepers 101 (FIG. 9, 10) stacked on top of one another are fixed non-displaceably against one another in a plane aligned parallel to the underside of the sleepers 101. At the same time, the height of the first alignment aids 132, 133 is adapted to the depth of the second alignment aids 134, 135 such that the sleepers 101 sitting on one another are held at a defined distance.

Figure 10:
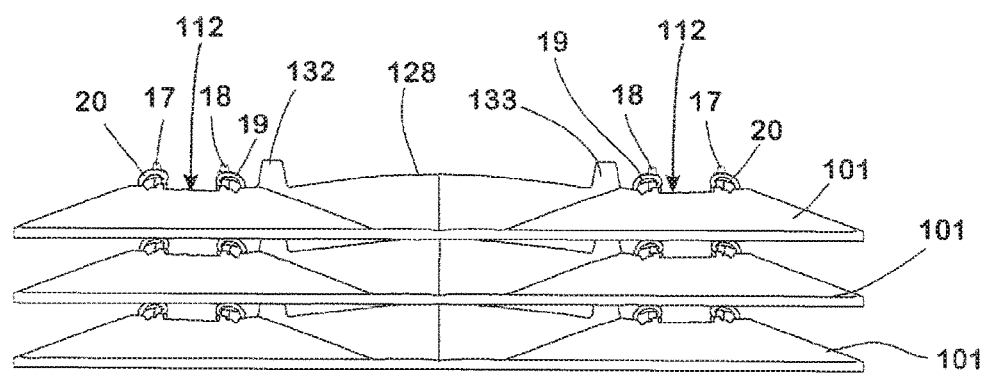
FIG. 10 a stack of sleepers in a lateral view.

In addition to the second alignment aids 134, 135, further recesses 136, 137, 138 are formed into the underside 5; 105 of the sleepers 1; 101 in the region of the base surfaces 6; 106 of the end sections 2, 3; 102, 103. These recesses 136, 137, 138 are in this case positioned and shaped such that in the case where, on the sleepers 1; 101, the components (tensioning clamps 19, 20; sleeper screws 17, 18) provided to fasten the rails S1, S2 are pre-installed on the cover surface 108 and correspondingly fitted sleepers 101 are supposed to be stacked in a stack (FIG. 10), the components in question freely protrude into the assigned recesses 136, 137, 138 and contact between them and the sleeper 1; 101 sitting on it is avoided. In the case where the sleepers 1; 101 are placed on a ballast bed, the recesses 136, 137, 138 and the second alignment aids 134, 135 serve as further grouting points into which the ballast stones protrude and thus also prevent a displacement of the sleeper 1; 101 on the ballast bed.

In order to maximise the bending stiffness of the webs 27, 28; 127, 128 and to optimise their permanent bond to the end sections 2, 3; 102, 103, one reinforcement 40; 140 is in each case laid into the sleepers 1; 101 which is represented only for the sleeper 101 here for the sake of clarity.

The reinforcement 40; 140 in each case fully embedded into the plastic/sand material of the sleepers 1; 101 consists of a high-strength material, such as, for example, a strand of high-strength fibres or a steel rod.

The reinforcement 40; 140 of the sleepers 1; 101 in each case runs in the webs 27, 28; 127, 128 and the end sections 2, 3; 102, 103 and is positioned in the upper quarter of the height H of the sleeper 1; 101. In this case, the reinforcement 40; 140 is shaped into a closed, O-shaped loop such that its longitudinal sections 141, 142 extend following the course of the web sections 29, 30; 129, 130 in each case from one end section 2; 102 to the other end section 3; 103 and the short sections 143, 144 of the reinforcement 40; 140 connecting the longitudinal sections 141, 142 are anchored in an edge region 45, 46; 145, 146 of the end sections 2, 3; 102, 103 assigned to the chamber 31 and arranged in the upper section of the narrow sides 10; 110 adjoining the cover surface 8; 108.

The sleepers 1, 101 have in each case been manufactured in one piece from a plastic/sand mixture according to the method which is already described in PCT/EP2016/059064 already mentioned above and incorporated into the present application.

Accordingly, a quartz sand has been provided for the manufacture of the sleepers 1, 101, whose bulk density was approx. 1.9 g/cm$^3$ in the case of hardness of 7 determined according to Mohs (see, for example, Detlef Gysau, "Füllstoffe", 3rd Edition, Hannover: Vincentz network, 2014, ISBN: 9783866308398) and an average grain diameter of the sand grains of 0.1 to 0.5 mm.

Similarly, a plastic granulate was provided which consisted of a mixture of polypropylene plastic grains (PP granulate). The melt flow index of the PP plastic granulate determined at 230° C. and a load of 2.16 kg was more than 20.

Prior to mixing with the plastic granulate, the sand was heated to 220° C. with the aid of a heating cartridge immersed in the sand and heated by means of a heated oil. The temperature of the plastic granulate, in contrast, corresponded to the room temperature.

The hot sand was then mixed in an extruder with the plastic granulate. The dosing of sand and plastic granulate took place such that the sand/plastic mixture obtained consisted 35 mass % of plastic granulate and as the remainder of sand. In the course of the mixing, the plastic granulate was heated and the hot sand cooled accordingly such that the obtained sand/plastic mixture had a pressing temperature of 170° C. The plastic granulate was already fully melted at this temperature.

The sand/plastic mixture tempered in this manner was filled into a pressing tool representing a mould of the respective sleeper 1, 101 and not shown here, whose temperature was held at at least 120° C. The reinforcement 40; 140 was previously arranged in the pressing tool corresponding to its position provided in the finished sleeper 1; 101.

The sand/plastic mixture was then held in the mould for a duration of, for example, 30 minutes at a pressure of 3.6 MPa. In this way, the mould was filled evenly with the sand/plastic mixture such that the details of the sleeper 1; 101 predefined by the mould were represented faultlessly and an intensive bond of the sand to the plastic surrounding it occurred.

After the end of the pressing time, the mould was opened and the obtained sleeper 1; 101 was cooled to a demoulding temperature of 60° C. at which the sleeper 1; 101 was ultimately removed from the mould.

The obtained sleeper 1; 101 had a high break resistance such that it could permanently and securely absorb loads occurring during practical use.

In this case, it was proven that the pull-out resistances, i.e. the forces necessary to pull out the anchoring (sleeper screws 17, 18) of a rail fastening from the sleeper 1; 101 are notably greater than the minimum value prescribed for this purpose in practice.

Similarly, tightening torques were achieved in the case of tests with conventional sleeper screws 17, 18 which were above 60 kN, for example, 70 kN and above.

Figure 7:
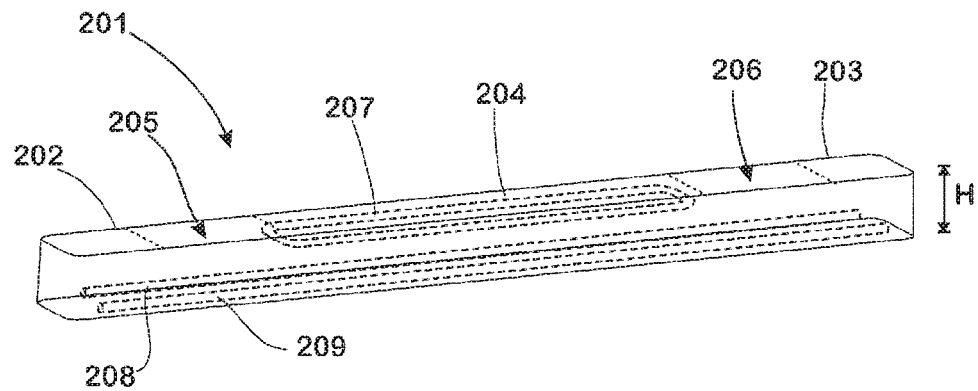
FIG. 7 a third configuration of a sleeper in a perspective view.

The sleeper 201 represented in FIG. 7 is manufactured in the same manner as the sleepers 1, 101, but has a substantially purely square design, simplified compared to the sleepers 1, 101, with two end sections 202, 203 and a middle section 204 arranged between the end sections 202, 203. On the upper side of the end sections 202, 203, in each case one contact surface 205, 206 is formed for the two rails to be installed on the sleeper 201, but not shown here.

A reinforcement 207 shaped in the manner of a rectangularly designed, continuous, i.e. closed loop is also laid into the sleeper 201 in the upper quarter of the height H of the sleeper 201. The reinforcement 207 is anchored with its short sides in each case in the edge region of the end sections 202, 203 with which the end section 202, 203 in question is in each case connected to the middle section 204 of the sleeper 201.

Moreover, additional reinforcements 208, 209 in the form of solid reinforcement rods consisting of a bar material or reinforcement threads consisting of high-performance fibres are laid into the sleeper 201. The additional reinforcements 208, 209 are arranged in the lower quarter of the height H of the sleeper 201 parallel and spaced apart from one another such that they are in each case embedded into the material of the sleeper 201 close to the longitudinal side of the sleeper 201 assigned in each case. In this case, the additional reinforcements 208, 209 extend over approximately the entire length of the sleeper 201 to the region of the end sections 202, 203 on which the contact surfaces 205, 206 for the rails to be fastened on the sleeper 201 are formed.

The additional reinforcements 208, 209 thus assure optimal bearing capacity of the sleeper 201 in particular also in the region of their end sections 202, 203, whereas the reinforcement 207 ensures the permanent bond of the middle section 204 to the end sections 202, 203.

Figure 8:
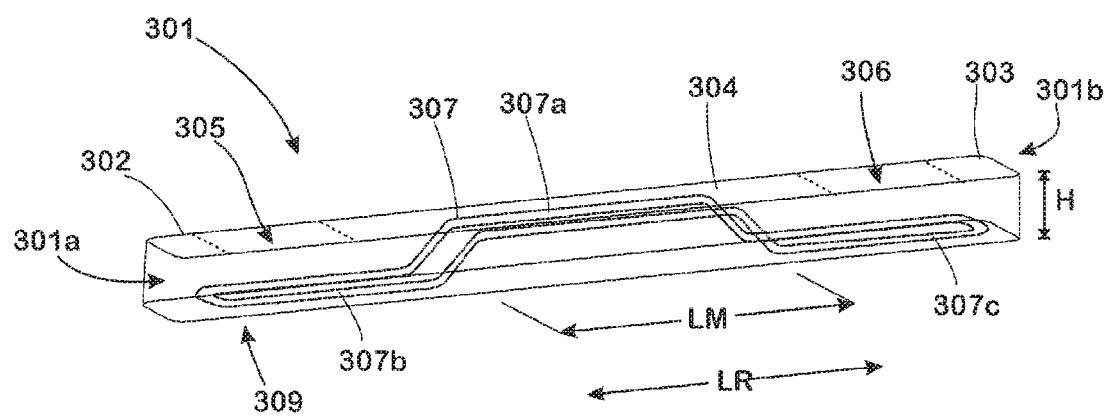
FIG. 8 a fourth configuration of a sleeper in a perspective view.

The sleeper 301 represented in FIG. 8 is also manufactured like the sleepers 1, 101, 201 and, corresponding to the sleeper 201, has a simple, square and elongated design with two end sections 302, 303 and a middle section 304 arranged therebetween.

A reinforcement 307 is laid into the sleeper 301. The reinforcement 307 is, for example, formed in one piece from a steel rod, which is bent into a closed loop with two long arms aligned parallel and at a distance to one another, which run in the longitudinal direction LR of the sleeper 301, and two short arms, of which in each case one connects the ends of the long arms of the reinforcement 307 assigned to one another and to the respective longitudinal-side end 301*a*, 301*b*.

The reinforcement 307 has a middle part 307*a* formed by the middle sections of the long arms of the reinforcement 307 running in the longitudinal direction LR, which extends in the upper quarter of the height H of the sleeper 301 over the length LM of the middle section 304 into the edge region of the end sections 302, 303 of the sleeper 301 adjoining the middle section 304.

The middle part 307*a* sits between two end parts 307*b*, 307*c* of the reinforcement 307. The end parts 307*b*, 307*c* are formed by the end side-sections of the long arms assigned to the respective end section 302, 303 and the short arms of the reinforcement 307 assigned in each case. The end parts 307*b*, 307*c* of the reinforcement 307 run in each case proceeding from the assigned end of the middle part 307*a* firstly in oblique alignment in the direction of the underside 309 and of the longitudinal-side end 301*a*, 301*b* of the sleeper 301 in each case assigned to the end part 307*b*, 307*c* in question. They then extend in the region of the lower quarter of the height H parallel to the underside 309 of the sleeper 301 over the region 302a, 303a of the respective end section 302, 303 on which in each case the contact surface 305, 306 for a rail is formed.

In this way, on the one hand, maximum load-bearing capacity of the sleeper 301 is achieved by the reinforcement 307 in its middle section 304 and optimal bonding of the middle section 304 to the end sections 302, 303 and similarly optimal supporting of the end sections 302, 303 in the region of the contact surfaces 305, 306 provided on them for the rail to be fastened there in each case.

REFERENCE NUMERALS

1 Sleeper
2, 3 End sections of the sleeper 1
4 Middle section of the sleeper 1
5 Underside of the sleeper 1
6 Base surface of the end sections 2, 3
7 Upper side of the sleeper 1
9, 10 Narrow sides of the end sections 2, 3
9a, 10a Longitudinal outer sides of the end sections 2, 3
11 Recess
13, 14 Ribs (forming elements to guide the rail foot F1, F2)
17, 18 Sleeper screws
19, 20 Tensioning clamps
21, 22 Channel (forming element to guide the tensioning clamps 19, 20)
23, 24 Surface (forming element to support the tensioning clamps 19, 20)
25, 26 Track clips
27, 28 Webs
29, 30 Web sections of the webs 27, 28
31 Chamber
40 Reinforcement
45, 46 Edge region of the end sections 2, 3 assigned to the middle section 4
101 Sleeper
102, 103 End sections of the sleeper 101
104 Middle section of the sleeper 101
105 Underside of the sleeper 101
106 Base surface of the end sections 102, 103
107 Upper side of the sleeper 101
108 Cover surface of the end sections 102, 103
109, 110 Narrow sides of the end sections 102, 103
109a, 110a Longitudinal outer sides of the end sections 102, 103
111 Recess
112 Contact surface of the end sections 102, 103
113, 114 Ribs (forming elements to guide the rail foot F1, F2)
115, 116 Indentations (forming elements to hold the sleeper screws)
121, 122 Channel (forming element to guide the tensioning clamps 19, 20)
123, 124 Surface (forming element to support the tensioning clamps 19, 20)
127, 128 Webs
129, 130 Web sections of the webs 127, 128
131 Chamber
132, 133 first alignment aids (bulges)
134, 135 second alignment aids (indentations)
136-138 Recesses
140 Reinforcement
141, 142 Longitudinal sections of the reinforcement
143, 144 Short sections of reinforcement
145, 146 Edge region of the end sections 102, 103 assigned to the middle section 104

201 Sleeper
202, 203 End sections of the sleeper 201
204 Middle section of the sleeper 201
205, 206 Contact surfaces
207 Reinforcement
208, 209 Additional reinforcements
301 Sleeper
301a, 301b Longitudinal-side ends of the sleeper 301
302, 303 End sections of the sleeper 301
302a, 303a Region of the respective end section 302, 303 on which in each case one contact surface 305, 306 for a rail is formed
305, 306 Contact surfaces for in each case one rail
307 Reinforcement of the sleeper 301
307a Middle part of the reinforcement 307
307b, 307c End parts of the reinforcement 307
309 Underside of the sleeper 301
B Width of the sleepers 1; 101
BE' Width of the cover surface 108
BR Width direction
F1, F2 Foot of the rail S1, S2
H Height of the sleepers 1; 101
L Length of the sleepers 1; 101
LE' Length of the upper side 7; 107 of the cover surface 108
LE Length of the base surface 6; 106
LR Longitudinal extension/longitudinal direction of the rails S1, S2
LS Longitudinal axis of the sleepers 1; 101
M Centre of the length L of the sleepers 1; 101
QS Transverse axis of the sleepers 1; 101
S1, S2 Rails

The invention claimed is:

1. A sleeper for a track superstructure, which is manufactured in one piece from a plastic material, wherein the sleeper has an elongated base shape with two end sections, which are connected by a middle section of the sleeper and are held at a distance and at their upper side in each case one contact surface is provided for in each case one rail to be supported on the respective end section, wherein a reinforcement extending in the longitudinal direction of the sleeper is embedded into the middle section, wherein the reinforcement extends over the length of the middle section, wherein the reinforcement is in each case anchored in an inner edge region of each of the end sections, wherein the inner edge region is located adjacent to the middle section, wherein the reinforcement is wholly or partially arranged in the upper quarter of the height of the sleeper, and wherein the reinforcement is anchored in the manner of a continuous loop with two longitudinal sections and two narrow sections of which in each case one extends between the ends of the longitudinal sections assigned to one another and is anchored in one of the inner edge regions of the end sections the middle section comprises two webs arranged spaced in the width direction and one of the longitudinal sections is embedded in one web, the other longitudinal section is embedded in the other web of the middle section and the two narrow sections are in each case embedded in the inner edge region of the end sections.

2. The sleeper according to claim 1, wherein the reinforcement in each case extends at least into the region of the end sections on which the contact surface for the rail to be supported is formed.

3. The sleeper according to claim 1, wherein the reinforcement is arranged exclusively in the upper quarter of the height of the sleeper.

4. The sleeper according to claim 1, wherein the middle section is formed by the two webs freely bridging the distance between the end sections, whose width measured in the width direction aligned transverse to the longitudinal extension of the sleeper is smaller than the width of the end sections also measured in the width direction and in that the reinforcement is embedded in the web.

5. The sleeper according to claim 3, wherein the height of the web is varied over the distance between the end sections of the sleeper.

6. The sleeper according to claim 1, wherein it is shaped mirror-symmetrically in relation to its longitudinal axis.

7. The sleeper according to claim 6, wherein the webs in each case has a first section running outwards proceeding from the first end section in the width direction and a second section which is connected to the end of the first section of the respective web and runs inwards back to the second end section.

8. The sleeper according to claim 1, wherein the reinforcement consists of a solid material.

9. The sleeper according to claim 1, wherein the reinforcement is shaped from a bar material.

10. The sleeper according to claim 1, wherein the reinforcement consists of a fibre material.

11. The sleeper according to claim 1, wherein on its upper side at least one first alignment aid is formed to which a second alignment aid is assigned on the underside of the sleeper and in that the alignment aids of the sleeper are arranged such that in the case where a sleeper provided with alignment aids in the same manner at least on its underside is placed to form a sleeper stack on the sleeper the alignment aid provided on the upper side of one sleeper cooperates with the second alignment aid present on the underside of the other sleeper placed on this sleeper and fixes the sleepers against one another in a plane aligned parallel to the underside of the sleepers.

12. The sleeper according to claim 1, wherein it is manufactured from a plastic/sand mixture, whose plastic content is 10 to 60 mass % and its remainder consists of sand with an average grain diameter of 0.1 to 0.5 mm.

* * * * *

UNITED STATES PATENT AND TRADEMARK OFFICE
CERTIFICATE OF CORRECTION

PATENT NO. : 11,396,728 B2
APPLICATION NO. : 16/605952
DATED : July 26, 2022
INVENTOR(S) : Winfried Bösterling et al.

It is certified that error appears in the above-identified patent and that said Letters Patent is hereby corrected as shown below:

On the Title Page

Column 2, Abstract, Line 8, delete "section" and insert -- section, --

In the Claims

Column 18, Line 52, Claim 1, delete "sections" and insert -- sections, --

Signed and Sealed this
Fifteenth Day of November, 2022

Katherine Kelly Vidal
*Director of the United States Patent and Trademark Office*